United States Patent Office 2,756,248
Patented July 24, 1956

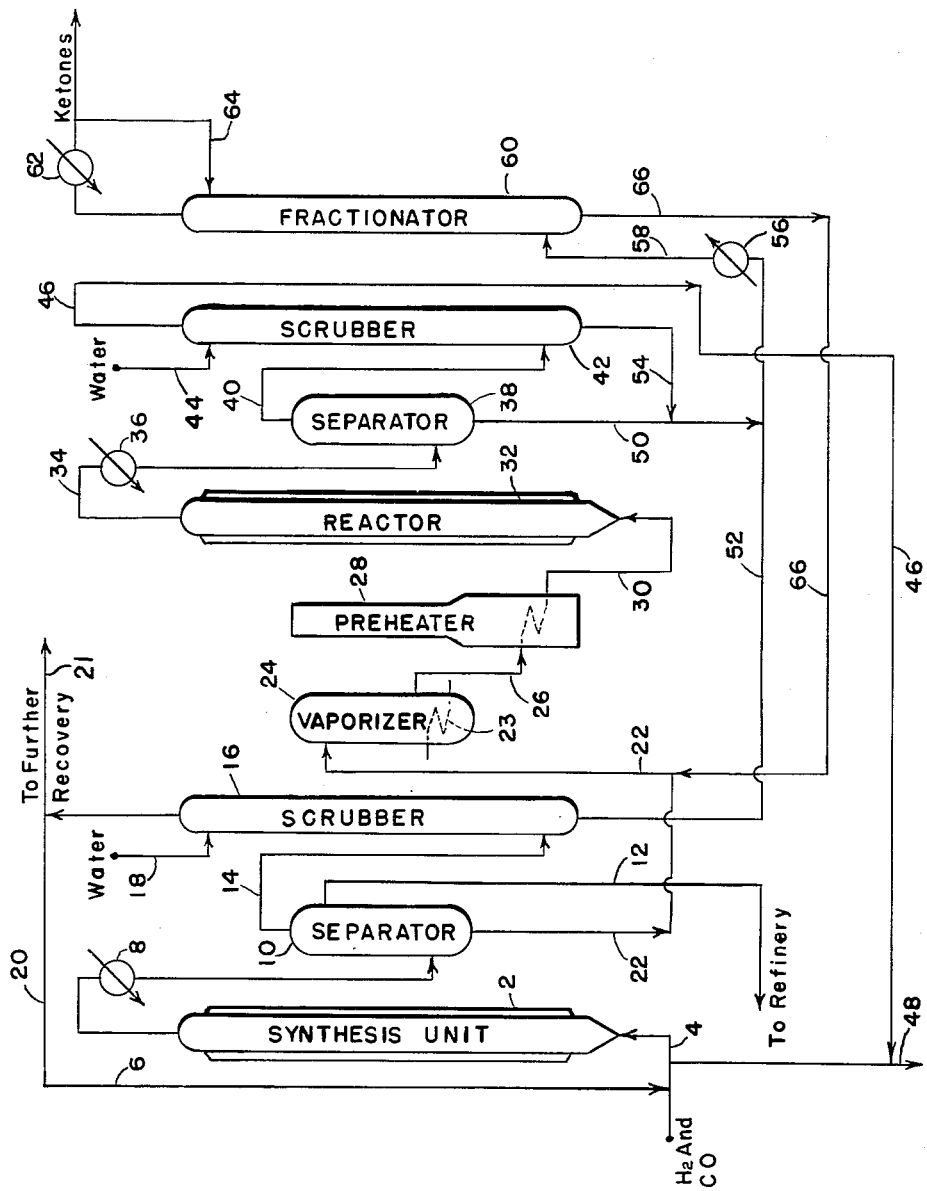

2,756,248

CATALYTIC CONVERSION OF OXYGENATED ORGANIC COMPOUND MIXTURES

Karol L. Hujsak and Richard Mungen, Tulsa, Okla., assignors to Stanolind Oil and Gas Company, Tulsa, Okla., a corporation of Delaware Application June 29, 1949, Serial No. 101,986

4 Claims. (Cl. 260—450)

Our invention relates to a novel method for altering the concentration of one or more classes of oxygenated organic compounds present in an aqueous mixture thereof. More particularly, it pertains to a method whereby the relative proportions of the classes of oxygenated organic compounds may be voluntarily controlled.

Mixtures of oxygenated organic compounds of the type contemplated by our invention may be derived from any number of sources. Typical of such mixtures are those encountered in the oxidation of hydrocarbons where oil and aqueous phases are obtained, both of which contain oxygenated organic compounds. Another important source of such mixtures is the Fischer-Tropsch synthesis which, in addition to an oil layer containing oxygenated organic compounds, yields a water layer containing not only lower primary and secondary alcohols, but also various other oxygenated organic compounds including ketones, aldehydes, and esters. While it is to be strictly understood that our invention is not limited to the utilization of mixtures of oxygenated organic compounds typical of those obtained in the Fischer-Tropsch synthesis, the present disclosure is based principally on the application of our invention to such mixtures.

In accordance with the now generally practiced modification of the Fischer-Tropsch synthesis, carbon monoxide and hydrogen in a ratio of about 1:2 are introduced into a suitable reactor at temperatures of from 260° to 370° C. and pressures of the order of 150 to 550 p. s. i. to produce a product mixture containing hydrocarbons, oxygenated organic compounds, and water. Thereafter this mixture is further separated into a gas phase, a liquid hydrocarbon phase, and a water phase. While this reaction is generally associated with the synthesis of hydrocarbons predominantly of the gasoline boiling range or the synthesis of hydrocarbons which can readily be converted into a fraction boiling in the aforesaid range, such reaction is likewise a very valuable source of aldehydes, ketones, acids, and alcohols. This chemicals fraction may frequently constitute as much as 25 weight per cent or more of the total, viz., hydrocarbons plus chemicals, and is generally found to be substantially equally distributed in the hydrocarbon or oil and water phases. The quantity of chemicals involved in a reaction of this type may be further appreciated when it is realized that the daily production of total chemicals from hydrocarbon synthesis plants now designed for commercial purposes is of the order of 500,000 pounds. However, the complexity of such chemical mixtures, even after they have been split into oil and water soluble fractions, has apparently discouraged some of the principal workers in this field from attempting to isolate these materials in a substantially pure state. In the past a common solution to this problem has consisted of recycling the water soluble chemicals back to the synthesis unit where they were mixed with synthesis gas and converted predominantly to gasoline hydrocarbons. The oil soluble chemicals were removed from the oil phase, for example, by extraction with a suitable solvent, separated from the resulting extract and likewise recycled to the synthesis reactor and converted into gasoline. If, on the other hand, it was desired to recover the oil and water soluble chemicals fraction, this object was accomplished by means of a series of complicated chemical and physical separation steps. It will be apparent to those skilled in the art, however, that because of the extreme difficulty encountered in the separation of the complex chemical mixtures involved, viz., the separation of a single component from an azeotropic mixture in which the other components form azeotropes with one another as well as with the component which it is desired to isolate, any system capable of satisfactorily accomplishing this object will add many thousands of dollars to the total construction cost of a commercial plant.

It is therefore an object of our invention to provide a method whereby the composition of the water soluble chemicals fraction, as well as the oil soluble chemicals fraction, if desired, may be controlled, thus rendering our process extremely flexible and making possible the production of only those chemicals that are economically attractive at current market conditions. A further object of our invention is to provide a method by which a selected class or classes of chemicals may be continuously produced to the exclusion of hydrocarbon synthesis and of other classes of chemicals present in the feed mixtures employed. A still further object of our invention is to provide a method by which ketones or acids or both of these classes of chemicals may be continuously produced from the remaining classes of chemicals present in the feed mixtures employed.

In general, our invention contemplates subjecting mixtures of oxygenated organic compounds of the type encountered in the hydrocarbon synthesis process to relatively high temperatures and varying pressures in the presence of a catalyst. In accordance with a preferred embodiment of our invention, the mixture of chemicals is introduced into a reactor of the general design employed in hydrocarbon synthesis where conversion occurs in the presence of a suitable fluidized hydrocarbon synthesis catalyst such as, for example, iron, at a temperature of from about 145° to about 360° C. and at pressures of 15 p. s. i. and above. Thus, by treating an aqueous mixture of chemicals containing, for example, 8 per cent by weight of oxygenated organic compounds at relatively low temperatures and pressures (145° to 175° C. and atmospheric to about 100 p. s. i.) in accordance with our invention, an increase is obtained in both the ketone and acid content of the original feed mixture at the expense of the aldehydes and alcohols present therein. If, however, relatively high temperatures and widely varying pressures (285° to about 360° C. and atmospheric to about 600 p. s. i. or higher) are employed, the concentration of ketones is greatly increased at the expense of alcohols and aldehydes as well as acids. In this connection, it is to be pointed out that although the conditions utilized, i. e., temperatures, pressures, and catalysts, may be substantially identical to those employed in ordinary hydrocarbon synthesis, no synthesis of hydrocarbons occurs in the process of our invention owing to the absence of carbon monoxide and hydrogen from the reaction mixture in synthesis proportions.

The composition of the feed mixture may vary widely; however, in the majority of instances, the feed should contain at least 5 weight per cent chemicals and at least 5 weight per cent water. In employing the process of our invention in conjunction with the hydrocarbon synthesis process, we have found it desirable to use feeds, viz., primary water (the aqueous phase in the original hydrocarbon synthesis product mixture) in which the chemicals (ketones, aldehydes, acids, and alcohols) are present to the extent of from about 5 to 15 weight per cent, usually about 7.5 weight per cent. In general, the majority of chemicals present in the primary water comprise essentially acetaldehyde, ethanol, acetic acid, and acetone with smaller amounts of isopropyl alcohol, n-butanol, methyl propyl ketone, methyl ethyl ketone, propionic acid, etc. Such compounds present in smaller amounts are hereinafter referred to as "other chemicals." If desired, the feed composition may be further varied by adding thereto substantially hydrocarbon free mixtures of aldehydes, acids, and alcohols derived from the oil soluble fraction produced in hydrocarbon synthesis to obtain in increased concentration one or more of the classes of chemicals normally occurring in said water soluble fraction. The composition of the feed mixture employed may be still further varied by introducing into the feed mixture the still residue obtained in separating the increased quantities of ketones or acids from the product mixtures obtained in accordance with the process of our invention.

The catalyst employed in effecting our invention may be any of those that have previously been shown to be capable of promoting hydrocarbon synthesis by means of the reduction of carbon monoxide with hydrogen such as, for example, cobalt, nickel, ruthenium, and iron. In fluidized bed operations the catalyst is preferably employed in a state and under conditions such that the density of the catalyst bed ranges from about 65 to about 100 pounds per cu. ft. and preferably 85 to about 100 pounds per cu. ft. in the case of iron. The catalyst is maintained in a fluidized state under the reaction conditions employed by introducing the feed mixture in vaporous form at a linear velocity of between about 0.1 and 2.0 ft. per second. The concentration of catalyst employed in liquid phase processes may vary widely and, in general, will be determined by the activity of the particular catalyst employed. Thus, for example, with iron type hydrocarbon synthesis catalysts we prefer to use a concentration of approximately 1 pound of catalyst for each 0.2 to 0.5 mole of reaction mixture.

Our invention may be further illustrated by reference to the accompanying drawing wherein hydrogen and carbon monoxide in a molar ratio of about two moles of hydrogen to about one mole of carbon monoxide are obtained from a source not shown and introduced into synthesis unit 2 through line 4. In synthesis unit 2 the reactants may be subjected to contact with a suitable iron hydrocarbon synthesis catalyst such as, for example, mill-scale, in the form of a fluidized mass of finely divided solid particles. The reaction is effected at temperatures of the order of 260° to 360° C. and at pressures in the range of 150 to 400 p. s. i. to yield a liquid hydrocarbon phase and an aqueous phase. The products of this reaction are withdrawn from synthesis unit 2 through line 6 and condenser 8 into separator 10 where the liquid oil phase is withdrawn to the refinery through line 12 and the uncondensed gases, containing unreacted synthesis gas and normally gaseous products of conversion including ethane, methane, carbon dioxide, etc., leave separator 10 through line 14 and are introduced into scrubber 16 where the gas phase is countercurrently contacted with water introduced at the top of scrubber 16 through line 18. The above-mentioned normally gaseous conversion products may, if desired, be partially recycled to feed line 4 via line 20 where they are mixed with fresh feed and introduced into synthesis unit 2. The balance of these products may be sent through line 21 to a recovery system not shown where the gaseous components are recovered and further refined, if desired. The water layer from separator 10 is withdrawn through line 22 and transferred to vaporizer 24. Depending on whether or not it is desired to increase the concentration of ketones or acids or both classes of these chemicals, the primary water is heated in vaporizer 24, equipped with reboiler 23, to temperatures varying from about 85° to about 360° C. at pressures of one atmosphere and above. Thereafter the primary water in a completely or partially vaporized condition is withdrawn from vaporizer 24 through line 26 and introduced into preheater 28 where it is brought to reaction temperature, viz. 145° to 360° C., and then introduced through line 30 into reactor 32 containing iron mill-scale catalyst in a fluidized form. The temperature of reactor 32 is preferably maintained within the range of 145° to 360° C.; however, pressures of 1 atmosphere to 600 p. s. i., or higher, may be employed depending on the type of conversion desired. The product mixture is withdrawn from reactor 32 through line 34 and condenser 36 into separator 38 where the uncondensed products are withdrawn through line 40 and introduced into scrubber 42 where they are countercurrently contacted with water introduced in the top of scrubber 42 through line 44. The uncondensed gas phase issuing from scrubber 42 and which consists essentially of hydrogen and carbon dioxide is transferred through line 46 and mixed in the desired proportions with synthesis gas in line 4. Surplus gases in line 46 may be withdrawn from the system through line 48. The aqueous fraction in separator 38 containing water soluble chemicals and having ketones or both ketones and acids in increased ratio to the remaining chemical components thereof is withdrawn through line 50 and combined with scrubber water in line 52 and 54 from scrubbers 16 and 42, respectively, after which the combined fractions are conducted through heater 56 and introduced by means of line 58 into fractionator 60 where the ketones may be taken off overhead through condenser 62 and a portion of the condensate returned through line 64 to the top of the column as reflux. Further purification of the overhead fraction thus obtained may be effected in a known manner, if considered necessary or desirable. The bottoms portion which represents a relatively concentrated mixture of chemicals is withdrawn through line 66 and may be, if desired, combined with primary water in line 22 and the resulting mixture introduced into vaporizer 24. Where both ketones and acids are present in increased amounts in the mixture introduced into fractionator 60, the ketones may be removed in the overhead stream while the acids may be separated from the bottoms fraction by subsequent neutralization followed by distillation of impurities therefrom. The impurities separated from the ketones and acids may thereafter be combined with the primary water in line 22 and thus be further converted into the desired products, as indicated above. By the foregoing expedient, all of the aldehydes and alcohols present in the primary water stream may be converted into ketones and acids. In the event that only ketones are desired, all of the acids present in the original primary water may likewise be substantially completely converted into ketones along with the aldehydes and alcohols by recycling these chemicals to vaporizer 24 where they are combined with a fresh primary water fraction and processed in the foregoing manner.

In the above-mentioned drawing reference to certain equipment such as pumps, gages, valves, and the like which obviously would be necessary to operate the process has been intentionally omitted. Only sufficient equipment has been diagrammatically shown to illustrate the process, and it is intended that no undue limitation be read into our invention by reference to the drawing and description thereof.

Specific applications of the process of our invention are further illustrated by the example which follows:

*Example*

A reaction mixture having the composition indicated below was divided into three equal portions and thereafter each portion was separately introduced into a system of the type shown in the accompanying drawing where, after an initial heating period, it was brought into contact with a fluidized iron hydrocarbon synthesis catalyst. The vaporized reaction mixture was introduced into the reactor at a linear velocity of about 1.5 ft. per second and the fluidized catalyst bed had a density of approximately 90 pounds per cu ft. The results indicated below in tabular form were obtained by carrying out runs 1, 2, and 3 under the following conditions of temperature and pressure, respectively; 360° C. and 1 atmosphere pressure, 360° C. and 450 p. s. i. pressure, and 145° C. and 1 atmosphere pressure.

| Reaction Mixture | | Product Compositions | | | | | |
|---|---|---|---|---|---|---|---|
| | | Run #1 | | Run #2 | | Run #3 | |
| Component | Moles | Moles | Percent Gain | Moles | Percent Gain | Moles | Percent Gain |
| $CH_3CHO$ | .42 | .00114 | | .0056 | | .0016 | |
| $CH_3CH_2OH$ | 2.66 | .000033 | | .0050 | | .0087 | |
| $CH_3COOH$ | .75 | .12 | | .52 | | 1.07 | 43 |
| $H_2O$ | 93.92 | 91.7 | | 91.51 | | 91.24 | |
| $CH_3COCH_3$ | .40 | 2.25 | 460 | 2.05 | 412 | 1.77 | 340 |
| $H_2$ | 0 | 5.74 | | 5.72 | | 5.71 | |
| $CO_2$ | 0 | 1.85 | | 1.65 | | 1.37 | |
| Other chemicals | 2.84 | 2.84 | | 2.84 | | 2.84 | |

From the data presented it will be seen that very substantial conversions of aldehydes, alcohols, and acids to ketones may be realized at relatively high temperatures throughout a comparatively wide pressure range, while increased yields of acids as well as ketones may be obtained by operating at lower temperatures.

From the foregoing description it is evident that we have provided a process for increasing the yield of ketones and the combined yields of ketones and acids originally present in feed mixtures of the type herein set forth. Our invention further contemplates applications of the principles specifically disclosed above to the treatment of any mixtures of chemicals in which compounds of the classes taught herein, viz., alcohols, aldehydes, ketones, and acids, are present and the source from which such mixtures are derived is immaterial. In this connection, it is to be strictly understood that our invention may likewise be employed in the production of ketones and acids in general, i. e., aliphatic, cycloaliphatic, aromatic, and the like. Moreover, it will be apparent from the foregoing that the composition and nature of the classes of chemicals obtainable from mixtures such as, for example, hydrocarbon synthesis primary water, may be readily controlled and, if desired, substantially completely converted into a single class of chemicals, viz., ketones. In general, it may be said that our invention covers a method for altering the concentration of one or more of the above-mentioned classes of compounds contained in a mixture thereof by treating said mixture with a hydrocarbon synthesis catalyst at elevated temperatures and varying pressures in the substantial absence of hydrocarbon synthesis.

What we claim is:

1. A process for increasing the proportion of acids present in an aqueous mixture containing aldehydes and alcohols, which comprises contacting said aqueous mixture with an active iron hydrocarbon synthesis catalyst, in the absence of hydrocarbon synthesis, at temperatures of from about 145° to about 175° C. at pressures ranging from atmospheric to 100 p. s. i. whereby the aldehydes and alcohols are at least partially converted into acids, and recovering a mixture in which acids are present in increased ratio to the aldehydes and alcohols.

2. A process for increasing the proportion of acetic acid present in an aqueous mixture containing ethanol and acetaldehyde, which comprises contacting said aqueous mixture with an active hydrocarbon synthesis catalyst, in the absence of hydrocarbon synthesis, at temperatures of from about 145° to about 175° C. at pressures ranging from atmospheric to 100 p. s. i. whereby acetaldehyde and ethanol are at least partially converted into acetic acid, and recovering a mixture in which acetic acid is present in increased ratio to acetaldehyde and ethanol.

3. In a process for increasing the proportion of ketones and acids in an aqueous mixture containing primary alcohols and aldehydes, the step which comprises contacting said aqueous mixture with an active hydrocarbon synthesis catalyst, in the absence of hydrocarbon synthesis, at temperatures of from about 145° to about 175° C.

4. The process of claim 3 in which the catalyst employed is an active iron hydrocarbon synthesis catalyst.

References Cited in the file of this patent

UNITED STATES PATENTS

| 1,663,350 | Roka | Mar. 20, 1928 |
| 1,873,537 | Brown et al. | Aug. 23, 1932 |
| 1,961,912 | Querfurth | June 5, 1934 |
| 1,985,769 | Dreyfus | Dec. 25, 1934 |
| 2,002,794 | Querfurth | May 28, 1935 |
| 2,010,066 | Dreyfus | Aug. 6, 1935 |
| 2,015,094 | Woolcock | Sept. 24, 1935 |
| 2,027,378 | Hale | Jan. 14, 1936 |
| 2,568,841 | Arnold et al. | Sept. 25, 1951 |
| 2,626,209 | Morrell | Jan. 20, 1953 |
| 2,632,015 | Kratzer | Mar. 17, 1953 |

FOREIGN PATENTS

| 302,759 | Great Britain | Dec. 27, 1928 |